United States Patent [19]

Weirich et al.

[11] 4,319,772
[45] Mar. 16, 1982

[54] HYDRAULIC COUPLING DEVICE

[75] Inventors: Walter Weirich, Dortmund; Gunter Hennlich, Hattingen, both of Fed. Rep. of Germany

[73] Assignee: Gewerkschaft Eisenhutte Westfalia, Lunen, Fed. Rep. of Germany

[21] Appl. No.: 119,278

[22] Filed: Feb. 7, 1980

[30] Foreign Application Priority Data

Feb. 9, 1979 [DE] Fed. Rep. of Germany ....... 2904867

[51] Int. Cl.³ .............................................. F16L 35/00
[52] U.S. Cl. .................................... 285/26; 285/137 R
[58] Field of Search ................. 285/137 R, 24, 25, 26, 285/28, 29, DIG. 15, 136, 131, 132, 80, 81

[56] References Cited

U.S. PATENT DOCUMENTS

| 1,839,246 | 1/1932 | Moore | 285/137 R |
| 1,891,670 | 12/1932 | Ernst | 285/136 |
| 4,116,476 | 9/1978 | Porter et al. | 285/DIG. 15 |
| 4,149,567 | 4/1979 | Weirich | 285/137 R |

FOREIGN PATENT DOCUMENTS 2333189 11/1975 France ........................... 285/137 R Primary Examiner—Dave W. Arola
Attorney, Agent, or Firm—Sughrue, Mion, Zinn, Macpeak and Seas

[57] ABSTRACT

A hydraulic coupling device hydraulically couples a multi-line hose to a connector having a plurality of sockets. The coupling device comprises a screw cap, a plurality of plug pins, housed within the screw cap, and an annular holding disc for holding the plug pins. The plug pins are each connectible to a respective line of the hose. Each plug pin is engageable within a respective socket of the connector. One of the plug pins is of a larger diameter than the other plug pins, and constitutes an alignment pin for accurately aligning all the plug pins with the corresponding sockets of the connector.

9 Claims, 3 Drawing Figures

HYDRAULIC COUPLING DEVICE

BACKGROUND TO THE INVENTION

This invention relates to a hydraulic coupling device for hydraulically coupling a multi-line hose to a connector having a plurality of sockets. The invention is particularly useful in the hydraulic distribution systems used in underground mine workings, particularly for hydraulically advanceable mine roof support assemblies and other hydraulic appliances.

Systems are known in which numerous hydraulic lines are bunched together to form multi-line hoses which are interconnected by means of generally cylindrical plug couplings. A known plug coupling of this type includes a coupling device having a plurality of plug pins, and a connector having a plurality of sockets which mate with the plug pins, the coupling device and the connector being attached to respective multi-line hoses. The coupling device is provided with an alignment pin which mates with a corresponding aperture in the connector to ensure accurate alignment of the plug pins and the sockets. With this type of plug coupling, it is usual to bunch together only the pressure and control lines to form multi-line hoses, while the hydraulic return line (which is of larger diameter than the pressure or control lines) is laid as a separate line. The provision of this separate return line is disadvantageous in that it leads to additional expense, not only for the return line itself, but also for the additional couplings which are necessary to connect the return line to the various hydraulic appliances. Moreover, such a system having two sets of hoses takes longer to assemble, and occupies more of the valuable space in a mine working, than systems utilising only one hose for supply and return of pressurised hydraulic fluid.

SUMMARY OF THE INVENTION

The present invention provides a hydraulic coupling device for hydraulically coupling a multi-line hose to a connector having a plurality of sockets, the coupling device comprising a casing, a plurality of plug pins housed within the casing, and a holder for holding the plug pins, the plug pins each being connectible to a respective line of the hose, and the plug pins each being engageable within a respective socket of the connector, wherein one of the plug pins is of a larger diameter than the other plug pins and constitutes an alignment pin for accurately aligning all the plug pins with the corresponding sockets of the connector.

Thus, by using said one plug pin as an alignment pin, there is no need for a separate alignment pin. Moreover, as said one plug pin is of larger diameter than the other plug pins, it can be connected to a larger diameter line of the multi-line hose, and this larger diameter line can be the return line of a hydraulic control system for an underground mine working. The removal of the need for a separate alignment pin reduces the cost of manufacturing and assembling a hydraulic coupling arrangement incorporating such a coupling device. Moreover, the overall size and weight of the coupling device can be reduced.

Advantageously, said one plug is longer than the other plug pins. This helps to achieve an exact guidance of the plug pins into the sockets of the connector.

Each of the plug pins may be removably attached to the holder. Preferably, said one plug pin is rigidly attached to the holder, and the other plug pins are each attached to the holder in such a manner as to permit limited movement in any direction. This measure enables the other plug pins to adjust themselves to the positions of their associated sockets to recompense for unavoidable manufacturing inaccuracies and tolerences. Consequently, the coupling device can be connected to the connector without danger of damage or the application of larger forces, even where perfect alignment does not occur.

Advantageously, the plug pins are equispaced on a common pitch circle of the holder, and the holder is constituted by an annular disc.

Preferably, the holder is provided with a plurality of apertures, a respective plug pin being held in each of the apertures. The apertures in the holder may all have the same diameter, and the holder may be rotatably mounted in the casing.

The invention also provides a hydraulic coupling arrangement comprising a multi-line hose, a coupling device having a plurality of plug pins, and a connector having a plurality of sockets, each plug pin hydraulically connecting a respective line of the hose to a respective socket of the connector, wherein the coupling device is as defined above.

Preferably, said one plug pin is connected to a return line of the hose, and said other plug pins are each connected to a respective pressure line of the hose, and the return line has a larger diameter than the pressure lines.

Advantageously, the coupling device is attached to the hose by means of a rigid sleeve which connects the casing of the coupling device to a sheath which surrounds the lines of the hose.

BRIEF DESCRIPTION OF THE DRAWINGS

A hydraulic coupling device constructed in accordance with the invention will now be described, by way of example, with reference to the accompanying drawings, in which.

DESCRIPTION OF PREFERRED EMBODIMENT

Figure 1:
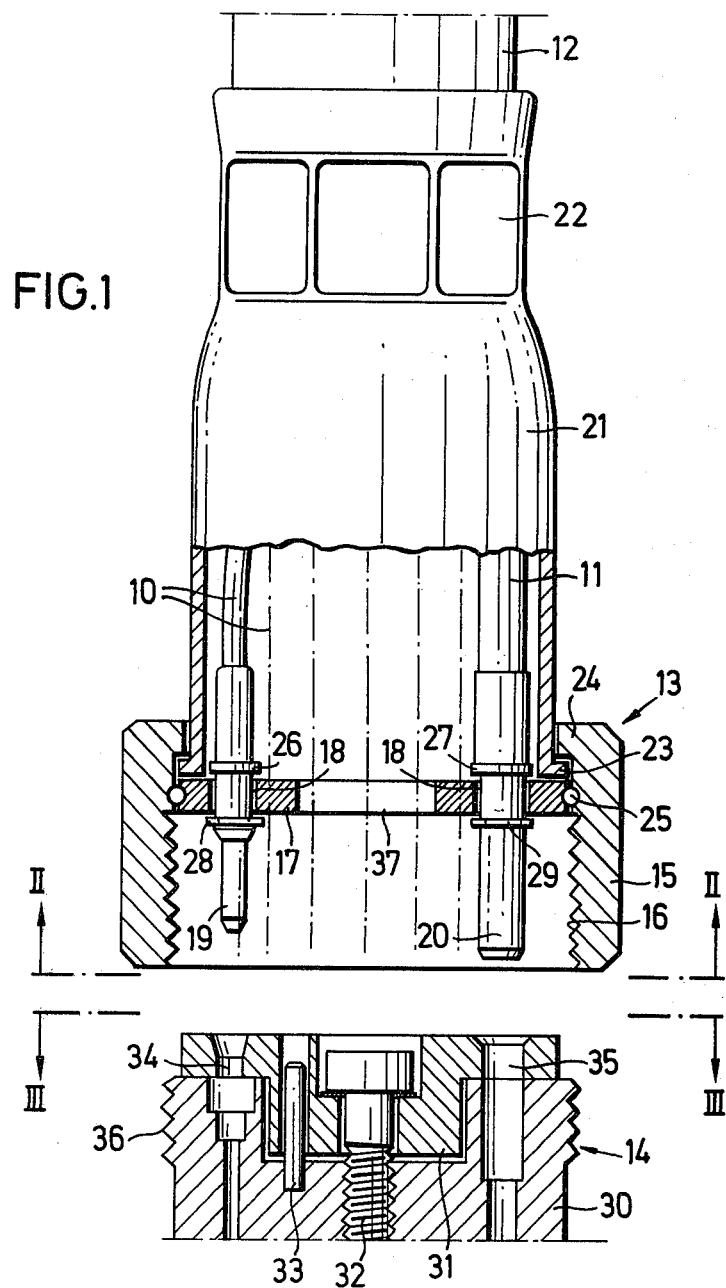
FIG. 1 is a part-sectional side elevation of the coupling device together with a connector and a hydraulic multi-line hose.
Figure 2:
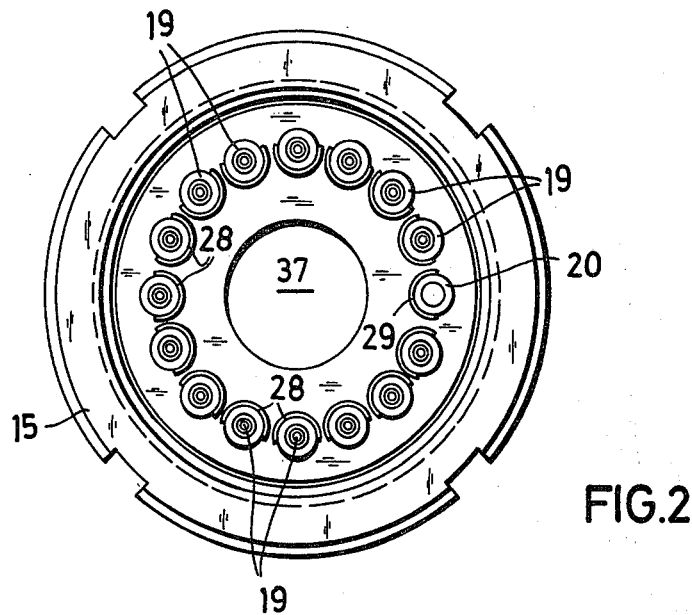
FIG. 2 is a cross-section taken on the line II—II of FIG. 1.
Figure 3:
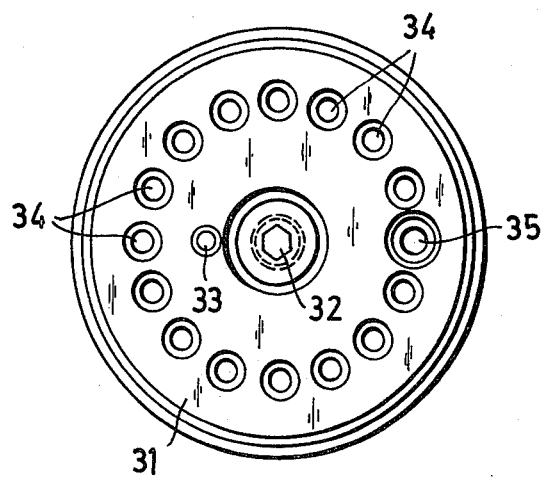
FIG. 3 is a cross-section taken on the line III—III of FIG. 1.

Referring to the drawings, FIG. 1 shows a multi-line hose which is constituted by a plurality of flexible conduits 10 and a flexible conduit 11, the conduits being bunched together inside a flexible sheath 12. Only one of the conduits 10 is shown fully in FIG. 1, some of the other conduits 10 being shown in dash-dot lines. The conduit 11, which has a larger internal cross-section and external diameter than the conduits 10, forms a hydraulic return line. The conduits 10 constitute hydraulic pressure lines.

The end of the hose is attached to a hydraulic coupling device 13, which itself is connectible to a hydraulic connector 14. The coupling device 13 has a casing 15 which takes the form of a screw cap having an internal screw thread 16. An annular holding disc 17 is provided within the screw cap 15, the holding disc being provided with a plurality of apertures 18 for receiving plug pins 19 and 20 which are fitted to the free ends of the conduits 10 and 11 respectively. The end of the hose is attached to the screw cap 15 by means of a rigid sleeve 21, one end of which is attached to the hose by radially-impressed portions 22. The other end of the sleeve 21 has an outwardly-extending annular flange 23 which engages behind an inwardly-extending annular flange 24 provided at the end of the screw cap 15.

The annular holding disc 17 rests against the annular flange 23 of the sleeve 21. The screw cap 15 and the holding disc 17 are rotatable relative to one another, but are interconnected in an axially non-displaceable manner. This rotatable connection is constituted by a wire 25 which is seated within facing annular grooves in the external circumferential surface of the holding disc 17 and in the internal cylindrical wall of the screw cap 15. The wire 25 is inserted into these grooves from the outside, the screw cap 15 being provided with an outwardly-facing recess (not shown) which extends into the base of the annular groove in its internal cylindrical wall, and through which the wire 25 can be introduced in the direction which is approximately tangential to that annular groove.

The plug pins 19 and 20 are provided with annular collars 26 and 27 respectively which rest against the rear side of the holding disc 17. The plug pins 19 and 20 are secured to the holding disc 17 by means of circlips 28 and 29 respectively which snap into corresponding annular grooves in the plug pins. A central shank portion of the larger-diameter plug pin 20 has a diameter which is substantially the same as that of its aperture 18, so that the plug pin 20 is a firm fit within its aperture. Consequently, the plug pin 20 is substantially rigidly connected to the holding disc 17. On the other hand, the central shank portions of the plug pins 19 have a smaller diameter than their apertures 18, so that the plug pins 19 are seated with a degree of radial play. At the same time, the plug pins 19 have a degree of axial play, as the spacing between their collars 26 and circlips 28 is slightly greater than the thickness of the holding disc 17.

The connector 14 can be attached either to another multi-line hydraulic hose, or to a valve block, assembly plate or the like. The connector 14 is constituted by two parts 30 and 31. The two connector parts 30 and 31 are of complementary shape, are connected together by means of a central bolt 32, and are accurately aligned in relation to one another by means of an alignment pin 33. The connector part 31 is provided with a plurality of plug apertures 34 and 35, the plug apertures being equispaced on one common pitch circle whose diameter corresponds to the pitch circle diameter of the plug pins 19 and 20. The diameter of the plug apertures 34 corresponds to the external diameter of the plug pins 19, and the diameter of the plug aperture 35 corresponds to the external diameter of the plug pin 20. Moreover, the plug aperture 35 is deeper than the plug apertures 34 so as to accommodate the plug pin 20 which is longer than the plug pins 19. The mouths of the plug apertures 34 and 35 are generally frusto-conical to facilitate the introduction of the plug pins 19 and 20 into the plug apertures. The external circumferential wall of the connector part 30 is provided with a screw thread 36 which matches the internal screw thread 16 of the screw cap 15.

In order to connect the coupling device 13 to the connector 14 to form a hydraulic coupling, the plug pin 20 is aligned with the plug aperture 35. Thus, the plug pin 20 acts as an alignment pin for accurate alignment of the coupling device 13 and the connector 14. This causes all the plug pins 19 to be in alignment with their corresponding plug apertures 34. The screw cap 15 is then screwed onto the connector part 30, so that the plug pins 19 and 20 are formed into their aligned plug apertures 34 and 35. Resilient sealing members (not shown) are positioned between the connector parts 30 and 31 to seal the plug pins 19 and 20 inside their plug apertures 34 and 35.

The holding disc 17 has a central aperture 37. Upon releasing the circlips 28 and 29, the plug pins 19 and 20 can be pushed back within the sleeve 21 sufficiently far as to disengage from their associated apertures 18 in the holding disc 17. It is then possible to extract a given plug pin 19 or 20 through the central aperture 37 in the holding disc 17, in order, for example, to replace a damaged plug pin. Thus, replacement of plug pins and connection of hydraulic conduits can be accomplished without having to disengage the screw cap 15 from the holding disc 17 by removing the wire 25.

We claim:

1. A hydraulic coupling arrangement comprising a multi-line hose, a coupling device surrounding an end portion of said multi-line hose and having a plurality of plug pins, a holder for holding the plug pins, said coupling device including an internconnected casing and sleeve means, and means connecting said holder to said casing means, and a connector having a plurality of sockets, each plug pin hydraulically connecting a respective line of the hose, and the plug pins each mating with a respective socket of the connector, wherein one of the plug pins is longer, and has a larger diameter than the other plug pins and constitutes an alignment pin for accurately aligning all of the plug pins with the corresponding sockets of the connector, and wherein said one plug pin is connected to a return line of the hose, and said other plug pins are each connected to a respective pressure line of the hose, said plug pins being positioned on a common pitch circle of the holder, said one plug pin being rigidly attached to the holder, and each of the other plug pins being attached to the holder in a manner such as to permit limited movement in any direction, and said casing and connector having cooperating connecting means therebetween.

2. A coupling device according to claim 1, wherein each of the plug pins is removably attached to the holder.

3. A coupling device according to claim 1, wherein the plug pins are equispaced around said common pitch circle.

4. A coupling device according to claim 1, wherein the holder is constituted by an annular disc.

5. A coupling device according to claim 1, wherein the holder is provided with a plurality of apertures, a respective plug pin being held in each of the apertures.

6. A coupling device according to claim 5, wherein the apertures in the holder all have the same diameter.

7. A coupling device according to claim 1, wherein the holder is rotatably mounted in the casing, by said means connecting said holder to said coupling device.

8. A coupling arrangement according to claim 1, wherein the return line has a larger diameter than the pressure lines.

9. A coupling arrangement according to claim 1, wherein the coupling device is attached to the hose by means of said sleeve means which connects the casing of the coupling device to a sheath which surrounds the lines of the hose.

* * * * *